United States Patent [19]

Khan

[11] Patent Number: 5,754,957
[45] Date of Patent: May 19, 1998

[54] METHOD FOR PERFORMING A HIGH SPEED AUTOMATIC LINK TRANSFER IN A WIRELESS PERSONAL COMMUNICATION SYSTEM

[75] Inventor: Tayyab Khan, Germantown, Md.

[73] Assignee: Hughes Electronics Corporation, El Segundo, Calif.

[21] Appl. No.: 611,917

[22] Filed: Mar. 6, 1996

[51] Int. Cl.⁶ ........................................ H04Q 7/38
[52] U.S. Cl. .............. 455/436; 455/439; 455/442; 370/331; 380/9; 380/48
[58] Field of Search ........................ 455/403, 436, 455/437, 439, 440, 442, 443, 444, 525; 380/9, 28, 48; 370/331, 332, 333

[56] References Cited

U.S. PATENT DOCUMENTS

| | | | |
|---|---|---|---|
| 5,081,679 | 1/1992 | Dent | 380/48 |
| 5,293,423 | 3/1994 | Dahlin et al. | 380/48 |
| 5,371,738 | 12/1994 | Moelard et al. | 370/331 |
| 5,553,027 | 9/1996 | Akerberg et al. | 370/195.1 |

Primary Examiner—Reinhard J. Eisenzopf
Assistant Examiner—Lee Nguyen
Attorney, Agent, or Firm—John T. Whelan; Michael Sales

[57] ABSTRACT

A method of implementing an improved automatic link transfer for high mobility use in a wireless personal communication system is provided. The method includes retuning a subscriber unit to a new radio port frequency, reading an access message and initiating encrypted voice transmission from the subscriber unit, based on the access message, before receiving an acknowledgement from a radio port controller. A data structure for an access rights message is provided including a frame counter variable to allow for expedited processing of an automatic link transfer. A data structure for an automatic link transfer request message is provided that permits faster determination of the type of automatic link transfer necessary.

16 Claims, 8 Drawing Sheets

FIG. 8A

| INFORMATION ELEMENT | LENGTH |
|---|---|
| MESSAGE TYPE | 1 |
| COMPLETE PORT ID | 6 |
| FRAME_COUNTER | 3 |

FIG. 8B

| INFORMATION ELEMENT | LENGTH |
|---|---|
| MESSAGE TYPE CONT | 1 |
| RESERVED | 7 |
| CHECKSUM | 2 |

| INFORMATION ELEMENT | LENGTH |
|---|---|
| MESSAGE TYPE | 1 |
| RCID | 3 |
| ALT_DN | 5 |
| ALT_COUNT | 1 |

| INFORMATION ELEMENT | LENGTH |
|---|---|
| MESSAGE TYPE CONT | 1 |
| COMPLETE PORT ID | 6 |
| ACCESS INFORMATION | 1 |
| CHECK SUM | 2 |

METHOD FOR PERFORMING A HIGH SPEED AUTOMATIC LINK TRANSFER IN A WIRELESS PERSONAL COMMUNICATION SYSTEM

BACKGROUND OF THE INVENTION

The present invention relates to an improved high mobility wireless communication system. More particularly, the present invention relates to a method intra-RPC automatic link transfer in a wireless communication system, and data structure for increasing the efficiency of Wireless personal communication services (PCS), such as Personal Access Communications Systems (PACS), strive to provide flexible communications services in a wireless fashion. Unlike typical cellular telephone systems, PCS systems tend to operate at lower transmission power levels and offer more flexibility to service providers and users. PACS, in addition to providing a system for improving or eliminating dropwire requirements to homes and businesses, provide some mobile wireless services. Radio transmitters are the vehicle for eliminating the need for wiring.

The U.S. Telecommunications Industry Association (TIA) has recently approved a PACS standard as set forth in PACS air specification J-STD-014 (hereinafter "PACS specification"). A consortium of telecommunication entities also developed a proposed standard for providing a system known as the Wireless Access Communications System (WACS). The proposed WACS standard, which includes the basic system hardware requirements for WACS and PACS, is set out in Bellcore Corp. publication TR-INS-001313 entitled Generic Criteria for Version 0.1 Wireless Access Communications Systems (WACS) published October 1993 (hereinafter "Bellcore specification"). This publication is available to those interested in WACS PCS from Bellcore Corp. at Bellcore, Customer Services, 8 Corporate Place—Room 3C-183, Piscataway, N.J. 08854-4156, or at 1 (800) 521-CORP. The reader is presumed to be familiar with these specifications and with related technological issues known to those having ordinary skill in the art.

The PACS specification and Bellcore specification describe an architecture for a wireless PCS system including subscriber units (SUs), radio ports (RPs), one or more radio port controllers (RPCs), and an access manager (AM). The SUs transmit information to the RPs using radio frequencies. The SUs may be fixed or mobile transceiver units. RPs are usually small, low power devices that are typically mounted on a utility pole and connected to an RPC using wireline facilities. Each RPC is connected to a switch that is part of the public switched telephone network (PSTN), and each RPC is connected to the AM. The AM provides overall coordination of RPCs and high-level control of the entire system.

The PACS standard also describes a conventional method of handing off a call from a first RP to a second RP known as automatic link transfer (ALT). When both the first and second RPs are connected to a single RPC, the handoff is referred to as an intra-RPC ALT. The ALT protocol described in the PACS air standard contemplates low mobility subscriber units in a wireless system. At high speeds, such as 50 to 65 mph, a SU may experience a handoff as frequently as every 22 seconds. Each handoff, or ALT, incurs some amount of speech loss when the call is transferred from one RP to another.

Excessive loss of speech during an ALT results in an audible pop or click. Shorter periods of speech loss, such as losses of 20 milliseconds or less, will not be noticeable by a user. Present methods of ALT for PACS may result in speech losses of more than 20 milliseconds. Therefore, it would be advantageous for an ALT process to take no more than 20 milliseconds to complete a handoff. Accordingly, there is a need for an improved method of performing intra-RPC ALT in a wireless personal communications system. Specifically, there is a need for a method for performing intra-RPC ALT in a wireless personal communications system that would eliminate excess speech loss during ALT in high speed environments.

SUMMARY OF THE INVENTION

The present invention relates to a method for performing intra-RPC ALT in a wireless personal communications system. The present invention also relates to a preferred data format for transferring information between a mobile subscriber unit and a radio port controller.

The method includes the steps of retuning a subscriber unit to a frequency for a new radio port. The radio port controller transmits, via the radio port, an access rights message. The subscriber unit reads the access rights messages including a frame counter variable included in the access rights message. The subscriber unit sends an automatic link transfer (ALT) request message to the radio port controller via the radio port. Following transmission of the ALT request message, and before receiving any reply from the radio port controller, the subscriber unit initiates encryption of voice or data information based on the frame counter variable received previously. The radio port controller sends, via the radio port, a cipher started message and, upon receiving this message, the subscriber unit returns an ALT complete message. In this manner, a handoff between RPs attached to a single RPC is accomplished with minimal voice or data loss due to the transfer. Preferably, the voice loss is less than 20 milliseconds.

A preferred format of messaging for use in expedited ALT includes message structures having encryption information and link transfer information. An access rights message includes a message type field, a complete port ID field and an encryption variable. The encryption variable is designed to notify a subscriber unit of information necessary to begin resending voice messages during a handoff procedure. In one embodiment, the encryption variable is a frame counter variable generated in the radio port controller.

According to another aspect of the present invention, an automatic link transfer (ALT) request message is provided. The ALT request message is configured such that a message type information element precedes a RCID. The RCID is followed by an ALT_DN and an ALT_COUNT. In a second segment, the ALT request continues with another message type information element followed by a complete port ID, access information and a checksum value. The positioning of the ALT_DN information element early in the ALT request message allows the RPC to determine whether the ALT will be inter or intra-RPC. The preferred data structures permit conversations broadcast to and from a subscriber unit to be handed off between radio ports with reduced voice or speech interruptions.

The invention itself, together with further attendant advantages, will best be understood by reference to the following detailed description, taken in conjunction with the accompanying drawings.

BRIEF DESCRIPTION OF THE DRAWINGS

FIGS. 8A and 8B are illustrations of a preferred access rights message data structure for use in the method of FIG. 7.

FIGS. 9A and 9B are illustrations of a preferred automatic link transfer request data structure for use in the method of FIG. 7.

DETAILED DESCRIPTION OF THE PRESENTLY PREFERRED EMBODIMENTS

The presently preferred method and data structures for improving high mobility performance in a wireless communications system may be implemented on any of a number of existing PCS systems. FIGS. 1–4 illustrate one preferred system and are described below. As will be apparent to those of ordinary skill in the art, other hardware implementations may be used to implement the presently preferred method.

Figure 1:
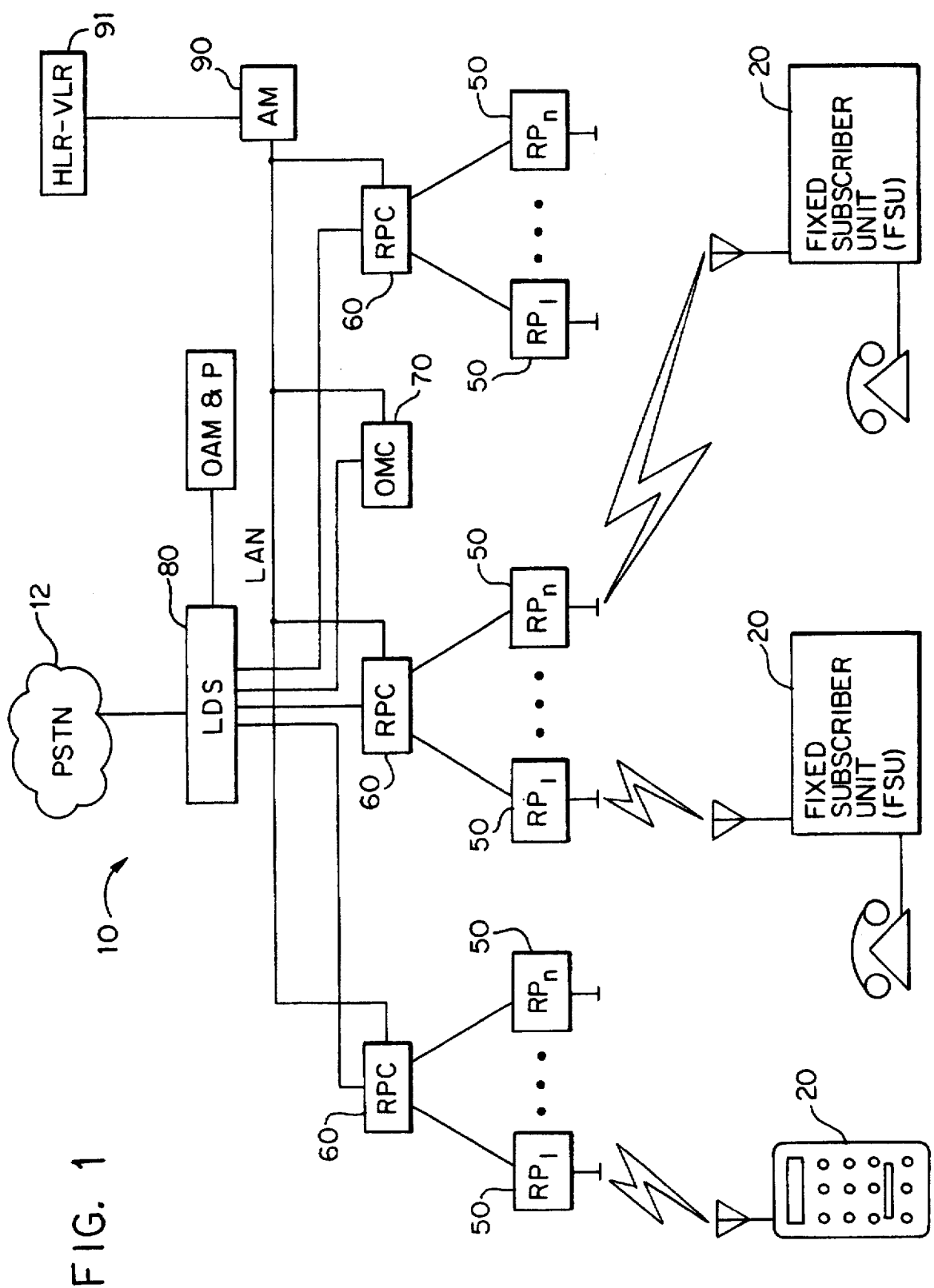
FIG. 1 is a block diagram of a wireless personal communications system capable of performing an automatic link transfer (ALT).

FIG. 1 illustrates a general block diagram of a wireless personal communication system 10 that may be used for PACS. The system 10 includes subscriber units (SU) 20, transceiver units which may be radio ports (RP) 50, radio port control units (RPC) 60, an operations maintenance center (OMC) 70, a local digital switch (LDS) 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between one or more wireless systems 10 and the public switch telephone network (PSTN) 12. The AM 90 provides call control, communicates with the switch 80 to provide voice paths between the PACS network and the PSTN, and connects to a home location register-visitor location register (HLR-VLR) 91.

The SU may be either a fixed subscriber unit or a portable subscriber unit. The SU 20, fixed or portable, provides voice and data quality comparable to a wired system. Unlike many cordless and cellular phones, the portable SU 20 digitally processes and filters all voice signals prior to broadcasting. An SU 20 may be located in the home or the office, or in a pedestrian, automobile, or other mobile environment. Multiple SUs 20 may be in range of a single RP 50 and may be in broadcast range of each other. Unless otherwise indicated, the term subscriber unit (SU) applies to both the fixed and the portable versions in the following descriptions. The SU 20 also may include a plurality of, and preferably two, receive chains connected to the two antennas to assure optimum reception in a fast fading environment encountered during high vehicular mobility.

Figure 2:
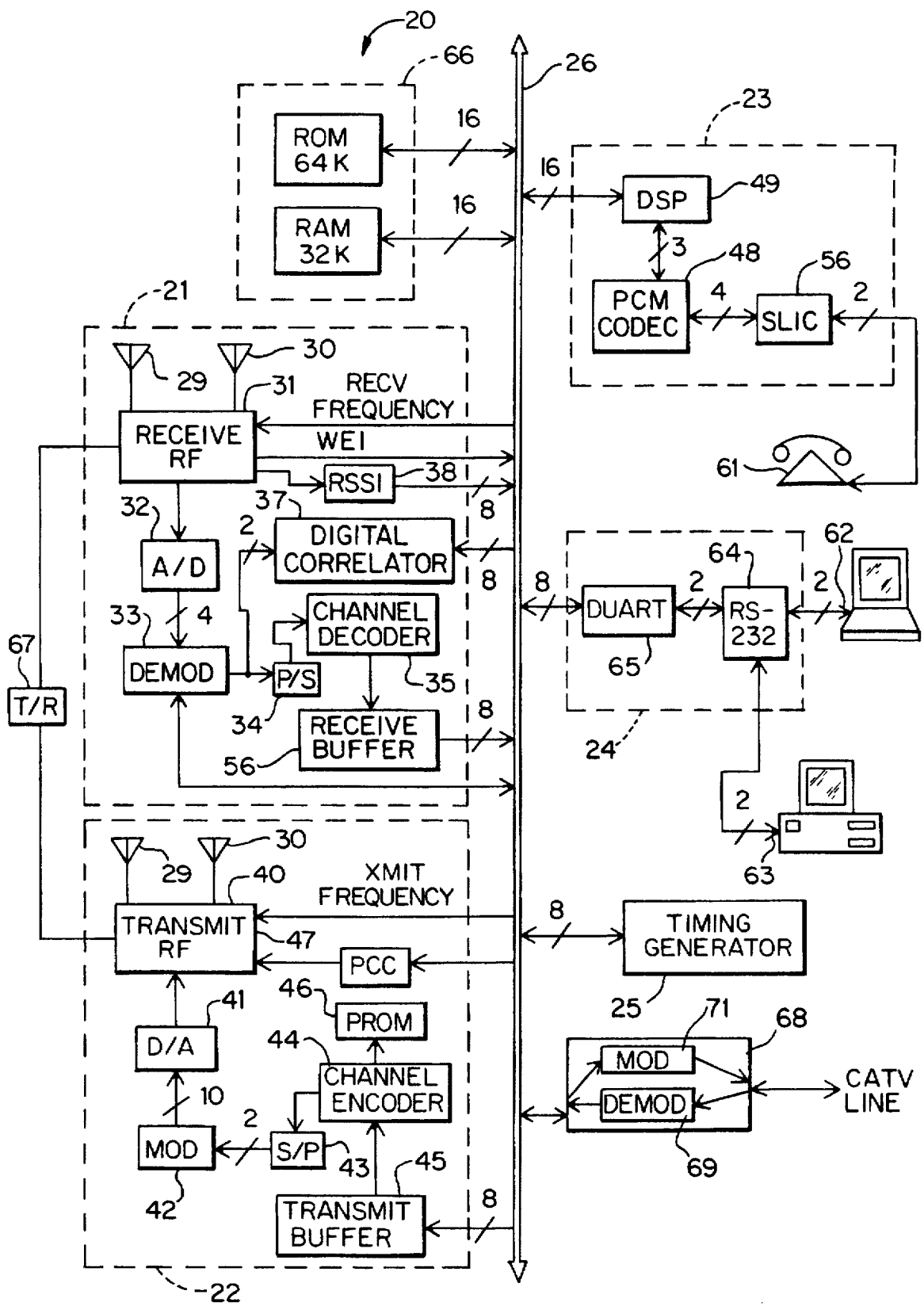
FIG. 2 is a block diagram of a preferred embodiment of a subscriber unit for use in the wireless personal communications system of FIG. 1.

Referring to FIG. 2, a preferred implementation of an SU 20 is shown in greater detail. The SU 20 has five connections to the outside environment: an RF receive antenna 30, an RF transmit antenna 29, a telephone connection 61, a data port 62, and a debug port 63. Internally, the subscriber SU 20 comprises an RF receive section 21, an RF transmit section 22, an analog port 23, a digital dataport 24, a timing generator 25, a memory section 66, and a databus 26 connecting all the internal blocks together.

The RF receive section 21 receives an RF input signal from the antenna 30. As shown in FIG. 2, there appear to be two antennas 29, 30 connected to the receive section 21. One antenna 29 is actually switched between the transmit and receive sections 21, 22 in standard PACS PCS. The RF section 21 recovers voice information from the RF signal in the form of a 32 kilobit per second (kbps) ADPCM signal. The RF section 21 also demodulates correlation information in the RF input signal. The received information, whether voice or data, is then placed on the databus 26. Conversely, the RF transmit section 22 receives voice or data information from the databus 26 and performs the function of transmitting voice or data information. Voice information is compressed to 32 kbps ADPCM and data information is simply modulated onto RF signals for transmission.

The analog port 23 receives analog information such as from an analog telephone and converts it to digital 32 kbps ADPCM for further processing and transmission over a radio link. Voice information arriving from the databus 26 in 32 kbps ADPCM form is converted to an analog signal and is communicated to a telephone connected to the port 23. The digital port 24 manages data signals sent to and from both the debug port 63 and the data port 62. The databus 26 is a 16-bit wide data line connecting the various internal functions of the SU 20.

A standard two wire loop may connect the analog port 23 to a standard analog telephone. Analog voice signals picked up at the handset of the telephone will be converted in a subscriber line interface chip (SLIC) 56 from the two wire signal to a four wire signal. The four wire format voice signals are sampled and coded into a 64 kilobit per second mu-law pulse code modulated (PCM) signal by a PCM codec 48 in the SU 20. The digital signal is then processed in the digital signal processor (DSP) 49 which compresses the PCM signal into a 32 kbps ADPCM signal. In a portable SU the SLIC 56 is unnecessary because the voice signals are received from a mouthpiece attached to the portable SU.

In the SU, the DSP 49 sends the ADPCM signal along a databus 26 to the RF transmit section 22 where it enters a transmit buffer 45. The digital signal is temporarily stored in the transmit buffer 45 and then is transferred to the channel encoder 44. The channel encoder 44 encodes the digital signal with synchronization information in accordance with instructions stored in a programmable read only memory (PROM) 46 integrated circuit. The program stored in the PROM 46 is a decoding and encoding algorithm such as that disclosed in the PACS specification which anyone of ordinary skill in the art may program into a PROM or other memory device. The encoded digital signal is transported through a serial-to-parallel (S/P) converter 43 to a modulator 42. The encoded signal is then converted from digital to analog in a digital-to-analog (D/A) converter 41 and transmitted from the transmit RF section 40 by an RF antenna 29.

Digital data signals originating at the digital input port 24 follow a different path. Initially, the signal coming in at a digital port 24 passes through an RS-232 connection 64 into a DUART device 65. The data information signal, unlike a voice signal, is not compressed into ADPCM format. The digital data signal is not processed in the PCM codec 48 or DSP 49. Instead, it proceeds along the same databus 26 as the voice signals and goes directly to the transmit buffer 45, the encoder 44 and then to the MOD 42 for modulation onto a carrier frequency.

After modulation, the signal (regardless of whether voice or data) is then converted to an RF signal approximately within the range of 1.8 to 2.2 GHz and transmitted from the RF transmit section 22 at an average power of approximately 10–20 milliwatts. The peak power transmitted is preferably no more than 200 milliwatts.

Signals received by the SU 20 from a PACS PCS system first arrive at the RF antennas 29, 30 and are processed through a receive RF unit 31. The received analog signals are converted to digital form in an analog-to-digital (A/D) converter 32 and then demodulated in a demodulator 33. The demodulated wave form is then passed through a parallel-to-serial (P/S) converter 34, decoded in a channel decoder 35, and passed through a receive buffer 36. As part of the demodulation and decoding of the signal, the signal is also passed through a digital correlator 37 to analyze timing synchronization. The decoded signal in the receive buffer 36 then passes on to the databus 26 to the appropriate analog or digital port 23, 24 as determined by the DSP 49. Suitable parts for the A/D and D/A converters 32, 41 are a CXD1175AM-T6 A/D converter and a CXD1171-T6 D/A converter available from Sony Corporation. The Demod and Mod 33, 42 may be a field programmable gate array (FPGA) such as the Xilinx XC4013 available from Xilinx at 2100 Logic Drive, San Jose, Calif. 95124-3400, programmed to meet the modulation requirements set forth in the PACS specification.

The central processing unit managing the processes in the SU 20 may be a digital signal processor (DSP) 49. A Texas Instruments TMS320C50 DSP chip is suitable and other DSP chips, such as a TI TMS320C53, may also be used. Additionally, the SU may be designed to incorporate a microcontroller, such as an 8051 type microcontroller, rather than a DSP. As will be apparent to those of ordinary skill in the art, the presently preferred method is not limited to operation on any one specific implementation of a SU.

The DSP 49 is used for both signal controls and performing the 32 kbps ADPCM speech encoding/decoding. The DSP 49 operates as a 16-bit parallel load processor utilizing a 16-bit wide data bus 26. The DSP 49 is driven by a clock frequency received from the RF transmit 22 and receive 21 sections. The clock frequency is approximately 16 MHz but higher or lower frequencies may be used.

Two components in the SU 20 require the attention of the DSP 49. The DUART 65, which handles data flow, and the channel encoder/decoder 44, 35, both generate interrupts to indicate that there is incoming data or that the component is ready for more data. The channel encoder/decoder 44, 35 is preferably a single chip such as a Xilinx XC4005-6PQ208C available from Xilinx. The channel encoder/decoder 44, 35 generates two separate interrupts; one for encoding and one for decoding.

The channel encoder 44 encodes a digital voice signal with the proper digital correlation information. The encoded signal is then modulated using π/4 differential quadrature phase shift keying (DQPSK) in PACS, with a raised-cosine spectral shaping filter. One method of encoding voice data generated at the SU 20 is to take the 64 kbps mu-law PCM signal created at the PCM Codec 48 and encode the information into 32 kbps ADPCM. The DSP 49 performs the encoding based on the CCITT Recommendation G.721 standard algorithm.

In standard PACS PCS, the radio port (RP) 50 performs the basic function of transmitting and receiving voice and data information between the SU 20 and the RPC 60. The RP 50 exchanges information with one or more SUs 20 over a radio link at RF frequencies, in the range of 1.8 to 2.2 GHz. The RP 50 may exchange information with a single RPC 60 over a standard Ti transmission line. In addition, one or more RPs 50 may communicate with the RPC 60 over a DS1 interface, a high bit-rate subscriber line (HDSL) interface, or using T1 interface methods.

Voice and data signals broadcast from an SU over a radio link at RF frequencies are received at the RP 50. The RF frequencies are downconverted from the RF frequencies to a 384 kbps data stream (in PACS). The 384 kbps data stream is decoded, processed, and then sent over a T1 line connected to an RPC. The decoded information received from an SU 20 and sent on to the T1 line is preferably in a 32 kbps ADPCM format. Conversely, ADPCM signals received from the RPC are processed, encoded, and converted to RF frequencies for transmission to an SU 20.

Figure 3:
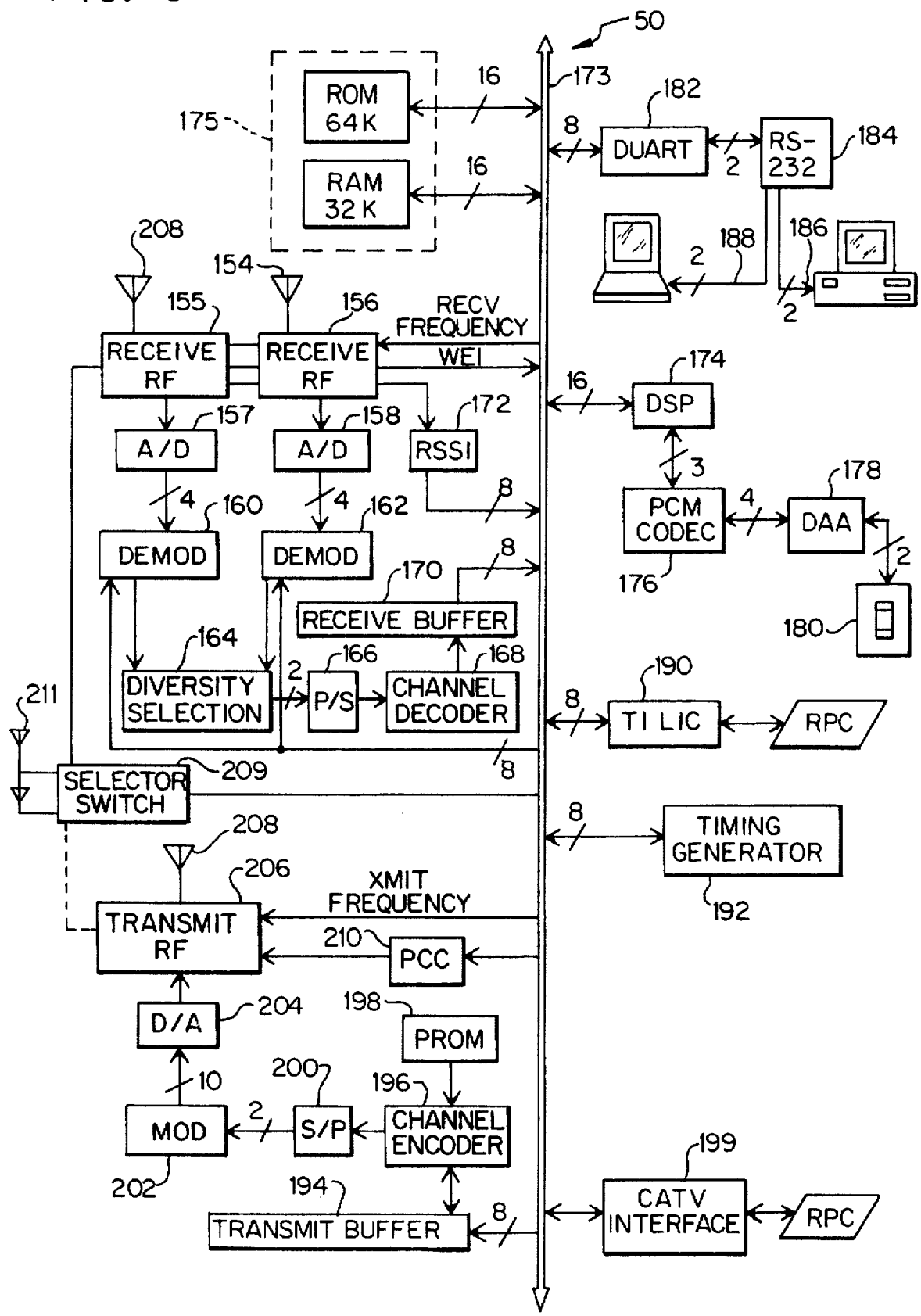
FIG. 3 is a block diagram of a preferred embodiment of a radio port for use in the wireless personal communications system of FIG. 1.

FIG. 3 illustrates the RP 50 in more detail. The RP 50 receives RF frequency signals from one or more SUs 20 on a pair of spatially diverse antennas 152, 154. The RP 50 is tuned to receive a particular frequency by the digital signal processor (DSP) 174, such as a TMS320C53. Alternatively, an 8051 type microcontroller may be used rather than a DSP. The received signal from the SU 20 is then downconverted in the receive RF sections 155, 156 respectively attached to the spatially diverse antennas 152, 154 Each receive RF section 155, 156 downconverts the same frequency and channels the downconverted signal to an analog-to-digital (A/D) converter 157, 158 respectively attached to the receive RF sections 155, 156. The A/D converters 157, 158 may be 8 bit, 20 Megasample per second A/D converters such as a CXD1175AM-T6 manufactured by Sony Corporation. The digital signals are transferred to modem demodulators 160, 162, which may be implemented as a Xilinx XC4005 or Xilinx 4013 chip. Once the digital signals have been demodulated in the demodulating sections 160, 162 they are compared in a diversity selector 164.

Following reception and downconversion of the RF frequencies and diversity selection, the signal is then processed through a parallel-to-serial (P/S) converter 166 and input in serial format to a channel decoder 168. The channel decoder 168 decodes the correlation information. The channel decoder 168 may comprise a Xilinx XC4005-6PQ208C chip. Information decoded in the channel decoder 168 is then forwarded to a receive buffer 170 prior to being sent on a databus 173 to a destination determined by the DSP 174. Voice information is transmitted along the databus 173 to the DSP 174. The DSP 174 then passes the 32 kbps ADPCM signal to the PCM Codec 176. The PCM Codec 176 receives the ADPCM signal and decodes it into an analog signal. The analog signal is then processed in a Data Access Arrangement (DAA) 178 for transmission along telephone lines.

Voice information received from the telephone lines or the RPC 60 is transferred along the databus 173 to the transmit buffer 194 in preparation for encoding in a channel encoder 196. The channel encoder may be a Xilinx XC4005-6PQ208C chip. The encoder 196 may be programmed with an algorithm, such as is disclosed in the PACS specification, in firmware installed in a PROM 198. The RP 50 also has a memory block 175 for extra program storage capability. The channel encoder 196 encodes the received 32 kbps ADPCM signal with information regarding timing and synchronization.

The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 20. For transmission of data where no encoding is necessary the encoder 196 and S/P converter 200 are bypassed and the databus 173 is directly connected to the modulator 202. This decision may be controlled by the DSP 174.

Figure 4:
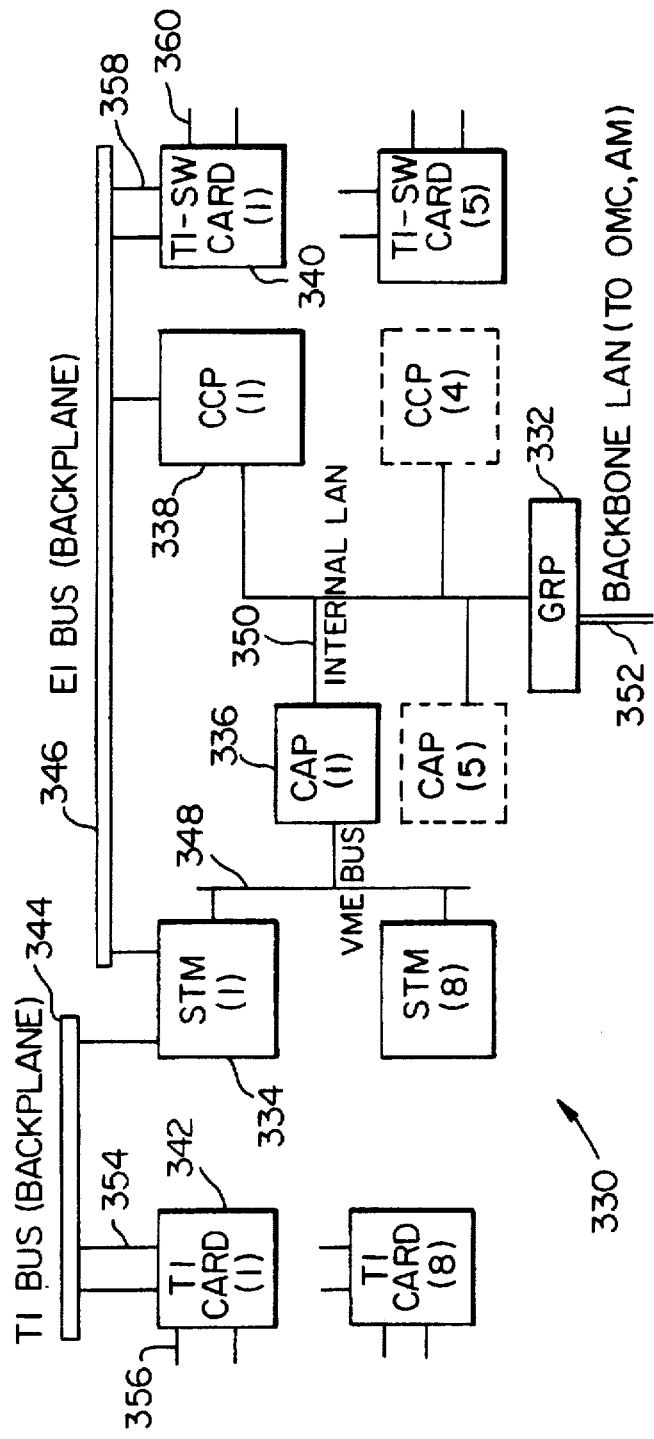
FIG. 4 is a block diagram of a preferred embodiment of a radio port controller for use in the system of FIG. 1.

A central component in the wireless personal communication system is an improved radio port controller (RPC) 330 as shown in FIG. 4. The RPC 330 manages RP 50 resources and controls the transport of information between a network switch 80 and its associated RPs 50. The RPC 330 interfaces with at least one RP 50 and with at least one switch 80. The RP 50 interface is preferably a DS1 layer 1 unchannelized interface allowing a 1.544 Mb/s clear channel and a TDM/TDMA layer 2 interface mapping the TDM/TDMA time slots to the DS1 channel. The RPC 330 to switch 80 interface may be a DS1 physical interface using the multiplexed ISDN Basic Rate Interface BRI communication protocol defined in the Bellcore specification.

In the basic configuration contemplated by the Bellcore specification, the RPC 330 performs call processing functions and transcodes compressed data into full PCM data and vice-versa. The RPC 330 exchanges signaling information with the SU 20 via the RP 50 and collects performance monitoring information (e.g. radio link quality, channel usage, channel allocation, traffic data, and system capacity information).

The RPC 330 includes a global resource processor (GRP) 332, a switching transcoder module (STM) 334, a common access processor (CAP) 336, and a call control processor (CCP) 338. The GRP 332 communicates over a backbone LAN 352 to the OMC 70 and to the AM 90. The GRP 332 also communicates with at least one CAP 336 and at least one CCP 338 over an internal LAN 350. The GRP 332 provides access to the external backbone LAN 352 and performs network management and other centralized RPC 330 functions. Each CAP 336 preferably communicates with up to eight STMs 334 over a high speed VME bus 348. Each STM 334 is connected to both the T1 bus 344 and the E1 bus 346. Also, each CCP 338 is connected to the E1 bus 346. The RPC 330 preferably includes up to five CAPs 336, and four CCPs 338. Additional components such as extra GRPs 332, CCPs 338, CAPs 336 and STMs 334, may be supported in the RPC 330.

In a high mobility environment, the RPC preferably streamlines internal processing by processing layer 2 messages in the CAPs 336 under interrupts. Other than the message formats discussed below, the layer 2 messages are set forth in the PACS specification. The layer 2 messages include automatic link transfer messages The STMs and CAPs are preferably synchronized to the message frames broadcast over the air between the SUs and RPs. By synchronizing the processing in the CAPs and STMs with the broadcast message frames, and using standard interrupt techniques to notify the RPC of incoming layer 2 messages, response to these layer 2 messages may be faster and voice loss minimized.

The RPC 330 also includes a T1 bus 344 and an E1 bus 346. The T1 bus 344 interfaces to a plurality of RP T1 cards 342. Each T1 card 342 can support up to two T1 lines 356, each interfacing with an RP 50. The T1 card 342 communicates with the T1 bus 344 over a T1 bus slot connector 354. Similarly, a T1 switch card 340 may communicate with the switch over two T1 lines 360. The T1 switch card 340 is coupled to an E1 bus slot connector 358 connected to the E1 bus 346. The RP T1 card 342 may be installed in slots 1, 3, 5, 7 of a backplane (not shown) providing up to 8 T1 lines to the RPs 50. The switch side T1 cards 340 may be installed preferably in slots 9, 10, 11, 12, 13 of the backplane providing up to 10 T1 lines 360 to the switch.

Figure 5:
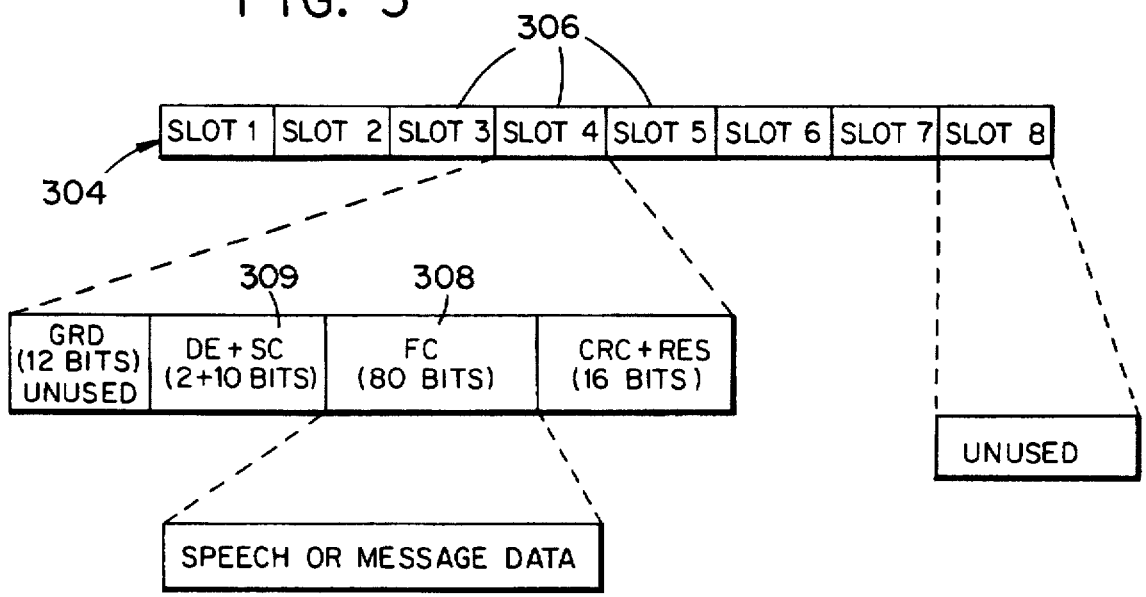
FIG. 5 is a preferred message format for an SU to RP uplink message in a PACS system.

In standard PACS PCS, the SU 20 employs a time division multiple access (TDMA) method of communicating digital information to a radio port 50. As best seen in FIG. 5, the formatted information transmitted from the SU 20 to the RP 50 is arranged in uplink message frames 304, each frame 304 comprising eight time slots 306. The SU 20 broadcasts information onto one of the time slots 306 in radio transmission bursts to the RP 50.

Each 120 bit burst (in PACS) of information lasts approximately 312.5 microseconds (2.5 milliseconds/8 timeslots) and is synchronized such that the burst always corresponds with an appropriate time slot 306 that the SU 20 reserved for the particular transmission. Each time slot 306 of the transmitted message frame 304 carries information necessary to synchronize the SU's 20 transmission burst. Each TDMA burst from an SU 20 contains several information fields: guard band (GRD), differential encoding (DE), slow channel (SC) 309; fast channel (FC) 308, cyclic redundancy check (CRC), and a reserved bit (RES).

Figure 6:
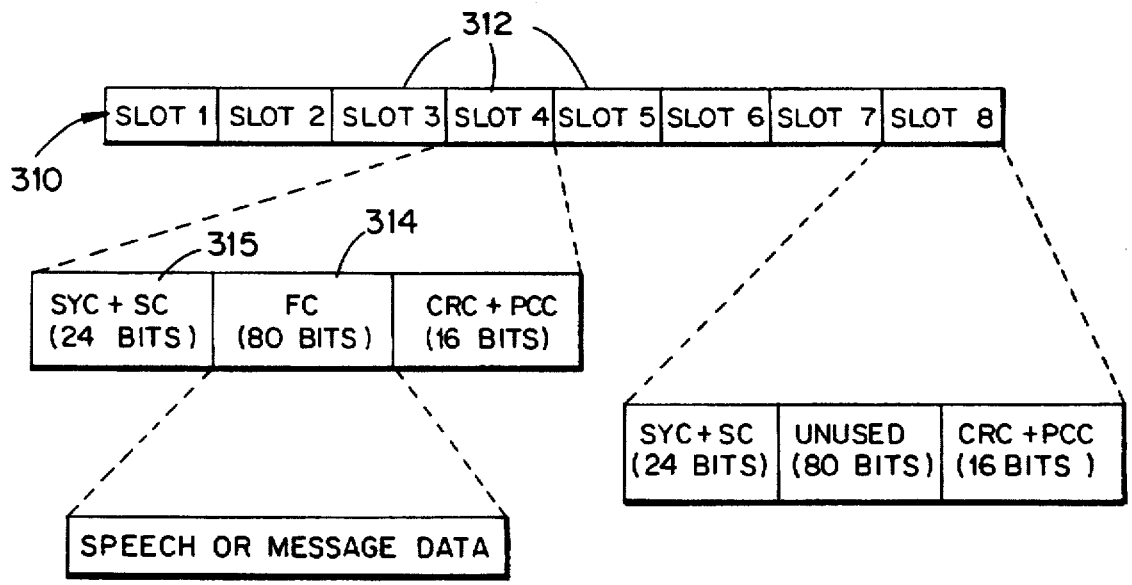
FIG. 6 is a preferred message format for a RP to SU downlink message in a PACS system.

FIG. 6 depicts the downlink message frame 310 received by an SU 20. An RP 50 transmits voice or data information to an SU in time division multiplex (TDM) format. TDM transmissions are continuous radio transmissions as opposed to the TDMA bursts. Again the SU 20 is allocated a specific 120 bit (in PACS) time slot 312 in the frame 310. The time slot 312 includes a synchronization pattern (SYC), a slow channel (SC) 315, a fast channel (FC) 314 containing the voice or data transmitted from the RP 50, a cyclic redundancy code (CRC), and power control channel (PCC) information.

Using communications hardware such as the wireless personal communication system discussed above, FIG. 7 illustrates a preferred method of performing intra-RPC ALT. As a user communicating over a SU moves out of range of a first RP (hereinafter "old RP") and into the range of a second RP (hereinafter "new RP"), a drop in signal power or quality will be detected at the SU. The SU is constantly monitoring other RPs and will begin transmitting to a new RP by initiating an automatic link transfer (ALT). The SU initiates the ALT by transmitting 250 a link suspend message to the RPC via the old RP using the radio link channel over which the SU has been communicating to the old RP. This message is not acknowledged by the RPC. The SU then retunes 252 to the frequency of the new RP, acquires frame synchronization to an available timeslot on the new RP, and reads the access rights message. The retuning process is managed by the DSP 49 in the SU 20 based on signal strength measurements. When the received signal strength of the present communication link falls below a predetermined level, the SU will attempt to tune to the frequency of another RP having the best received signal strength. The access rights message is continuously broadcast from RPs on any available timeslot, and preferably contains an encryption variable.

After finding an available timeslot, the subscriber unit transmits 254 an ALT request message to the RPC via the new RP over the new radio link channel. The SU broadcasts the ALT request message 284, 286 in the fast channel 308 of the available timeslot on the new radio port. The ALT request message preferably contains multiple information elements that are received at the RPC which identify the particular radio port the subscriber unit is now transmitting to. Once the entire ALT request message has been sent, the subscriber unit begins transmitting 256 encrypted voice information without waiting for any acknowledgement from the RPC. In one preferred embodiment, the SU begins transmitting encrypted voice in the uplink message frame directly following the message frame carrying the ALT request message.

As soon as the subscriber unit begins encryption, it also begins to continuously transmit a cipher_started message in the slow channel 309. The subscriber unit continues transmitting a cipher_started message until the RPC transmits 258 an acknowledgement (ACK) and voice information indicating that the RPC has begun an encryption process also. The SU returns 260 a ALT complete (ALT_COMP) message to the RPC once the start cipher message is received. The transfer of the radio link from the old RP to the new RP is now complete. The SU will continue broadcasting to the new RP until the conversation is complete or another ALT becomes necessary.

In one embodiment, the encryption process is preferably based on the BRAID algorithm used in PACS. The encryption variable passed in the access rights message may be a frame counter, generated at the RPC, necessary for the SU to begin encryption. In another embodiment, the wireless system may not support voice encryption or may simply not require encryption. In the event that encryption is not utilized, the RPC will still, send an encryption variable to the SU through the new RP. The subscriber unit will still go through the same steps described above except that it will not execute the encryption algorithm. If the SU is in an area where the presently preferred method for intra-RPC ALT is not available, the SU will note that the access rights message is missing the encryption variable. The SU will then begin to look for the standard PACS message format as set forth in the PACS specification.

Figure 7:
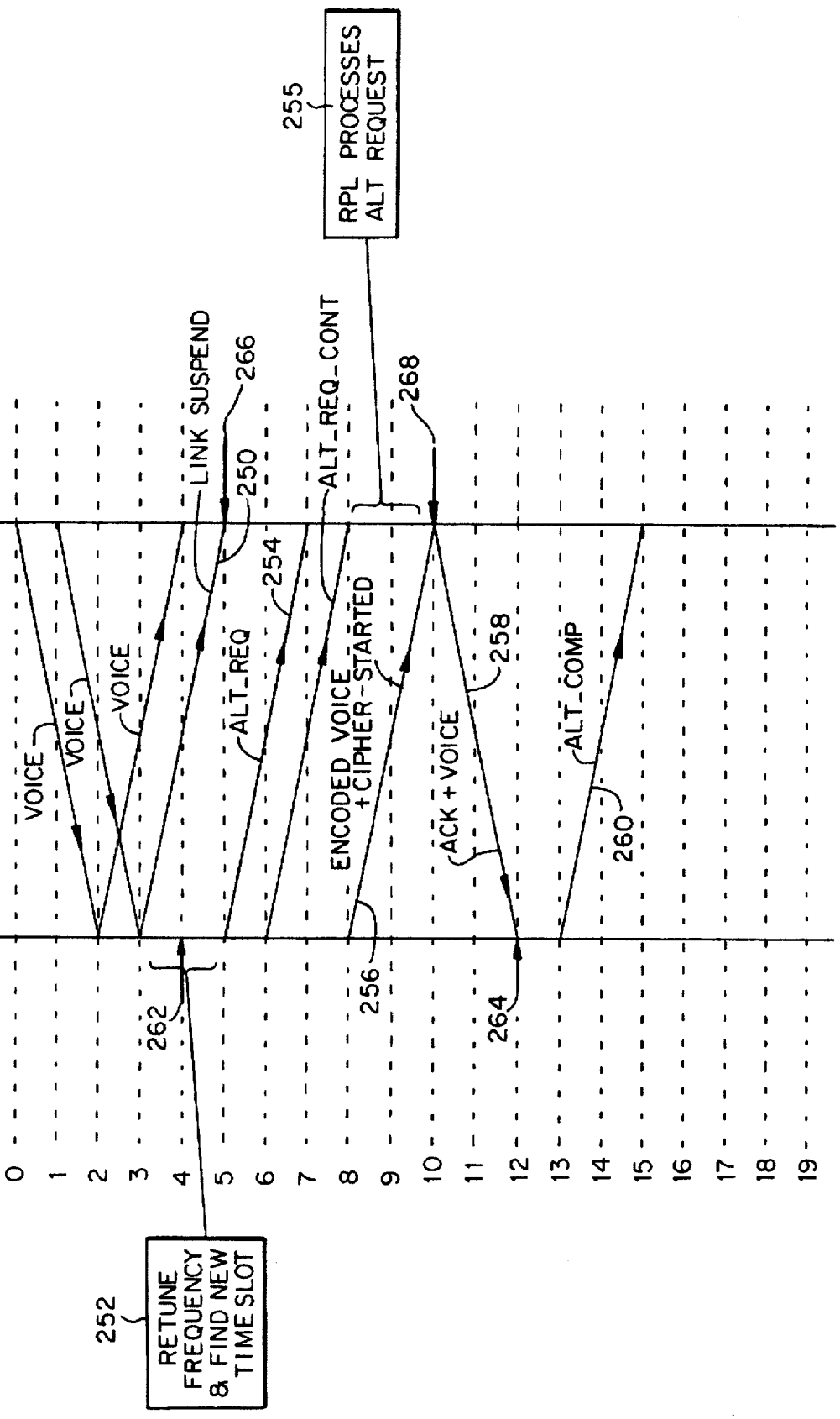
FIG. 7 is a ladder diagram illustrating a method of performing intra-RPC ALT according to a preferred embodiment of the present invention.

From the perspective of the RPC 330, the embodiment of the presently preferred method shown in FIG. 7 begins with generating and transmitting, via an RP with unused timeslots, an access rights message having an encryption variable. The access rights message, described in greater detail below, is generated in the CAP 336, transmitted over a wireline facility such as a T1 line to the appropriate RP 50, and transmitted over a radio channel via the RP 50. The RPC 330 receives 250 a Link_suspend message from an SU indicating that the radio link via the old RP is to be temporarily suspended. The RPC next receives 254 an ALT request message (ALT_reaq and ALT_req_cont) from the SU via the new RP.

Preferably, an ALT directory number (ALT_DN) is received in the first segment (ALT_req) of the ALT request message allowing the RPC 330 to determine whether the call is an intra-RPC ALT or whether the call is transferring from an RP managed by another RPC. Upon receipt of the ALT request, the RPC processes 255 the ALT request and ceases broadcasting the access rights message over the now occupied timeslot on the new RP. The RPC then receives 256 encoded voice in the fast channel and a cipher_started message in the slow channel 309 of the timeslot 306 in the uplink message frame 304 from the SU. The encoded voice is preferably encoded based on the encryption variable previously sent to the SU in the access rights message.

In response to the cipher_started message, the RPC returns 258 an acknowledgment (ACK) to the SU and begins sending encoded voice messages. The ACK message is sent in the slow channel 315 of the timeslot 312 in the downlink message frame 310 and the voice is sent in the fast channel 314. The ACK and cipher_started messages are four bit long synchronous directives defined in the PACS specification. In the presently preferred embodiment, the ACK message serves the purposes of acknowledging both the ALT request and the cipher_started messages from the SU. After acknowledging the cipher_started message, the RPC receives 260 an ALT complete (ALT_comp) message to indicate that the ALT tasks have been completed.

Voice loss is minimized at the SU using the presently preferred method. As seen in FIG. 7, the initial voice loss point 262, or absence of voice activity, begins approximately one message frame after the last voice message was received from the RP. Voice is again detected on the SU side of the radio link at the point 264 where the voice and ACK messages are received from the RPC via the new RP. The duration of voice loss is eight frames or less. On the RP side of the radio link, the voice loss is even less. The RP voice loss point 266 begins upon receipt of the link suspend message, one frame after the last SU voice transmission. Because the SU immediately 256 encrypts and transmits voice after sending 254 the ALT request, voice again reaches the RP at a voice start point 268 after five frames of voice loss.

In PACS, where each frame is 2.5 milliseconds, voice loss is 20 milliseconds at the SU and 12.5 at the RP. The example shown in FIG. 7 presents a worst case scenario where transmission and processing delays add up to 20 milliseconds of voice loss at the SU (in PACS) during ALT. Even less voice loss may be achieved if these hardware/software processing delays are reduced. A voice loss as short as 12.5 milliseconds may be achieved at the SU using the presently preferred method.

As shown in FIGS. 8A and 8B, a preferred data format for the access rights message 270, 272 received by the SU includes two segments. Preferably, the access rights message is transmitted via an RP over two consecutive PACS message frames 310 in the fast channel 314 of available timeslots 312. Each segment 270, 272 is ten octets in length, where each octet is made up of 8 bits of information. Multiple information elements are included in the two segments. Preferably the information elements include a message type 274, a complete port ID 276, a frame counter 278, a reserved (unused) portion 280 and a check sum 282.

The various information elements may have differing bit lengths. In the first segment 270, the message type 274 information element is preferably one octet in length and alerts the SU to the type of message to follow. The complete port ID 276 information element is positioned directly after the message type and is preferably a six-octet message containing four fields: the service provider identification, registration area identification, the radio port controller ID, and the radio port ID. The complete port ID 276 contains information to provide the subscriber unit with a unique address of a radio port and connected radio port controller. An encryption variable, such as a frame counter 278, is positioned directly after the complete port ID. In PACS an RPC continuously increments a frame counter information element 278 that the RP transmits to the SU. The frame counter has a three octet length and is a parameter used for encryption.

The message type 274 is again sent at the beginning of the second segment 272. The reserved portion 280 is 7 octets of empty space that may be used to convey other processing information to the SU. A checksum information element 282 directly follows the reserved bits 280. The checksum is an error checking parameter that is 2 octets in length.

Another data structure that is used in the presently preferred method is an ALT request message. As shown in FIGS. 9A and 9B, the ALT request message 284, 286 is preferably sent in two segments over consecutive uplink message frames 304. The first segment 284 includes a message type 288 field, a radio controller identification (RCID) 290, an ALT directory number (ALT_DN) 292, and an ALT counter (ALT_COUNT) 294. The second segment 286 repeats the message type information element 296 followed by a complete port ID 298, an access information bit 300, and a check sum information element 302. The preferred access rights, and automatic link transfer request message formats may be stored in memory in the SU and RPC. The memory block 66 in the SU 20 and the memory associated with the CAP 336 in the RPC 330 preferably contain the message formats for all layer 2 messages. As with the access rights message segments, the ALT request message segments 284, 286 are sent in the fast channel portion 308 of the desired timeslot 306.

In addition to improving intra-RPC ALT, the presently preferred method and data structures are compatible with existing methods of inter-RPC ALT. The present method and data structures integrate all the necessary information elements from the existing PACS standard and so are backwards compatible.

From the foregoing, an improved method of performing an intra-RPC ALT has been described that limits speech loss in a radio link transfer to no more than twenty milliseconds, improving the applicability of PCS systems to high mobility environments. The steps include suspending voice communication transmissions to a first RP, retuning to a second RP and receiving access rights information from the second RP. The SU then begins transmitting encoded voice information to the second RP immediately after transmitting an ALT request message without waiting for instructions, acknowledgements, or other information from the RPC.

Two data structures have also been described. An access rights data structure having an encryption variable in the first of two segments provides the SU with necessary encryption information. An ALT request message data structure has an ALT_DN variable in the first of two segments to reduce processing delay.

It is intended that the foregoing detailed description be regarded as illustrative rather than limiting, and that it be understood that the following claims, including all equivalents, are intended to define the scope of this invention.

What is claimed is:

1. A method of performing a link transfer in a wireless personal communications system comprising the steps of:
   retuning a subscriber unit to a frequency for a new radio port;
   reading an access rights message from the radio port, said access rights message having a frame counter variable;
   sending a link transfer request message from the subscriber unit to a radio port controller via the radio port;
   initiating encryption of voice information at the subscriber unit based on the frame counter variable;
   sending a cipher started message from the subscriber unit to the radio port controller via the radio port;
   receiving voice information and an acknowledgement message from the radio port controller to the subscriber unit, said acknowledgement message acknowledging the start of encryption; and
   sending a link transfer complete message from the subscriber unit to the radio port controller indicating completion of the link transfer process.

2. The method of claim 1 wherein the step of reading an access rights message further comprises reading a first segment of the access rights message in a first received frame and reading a second segment of the access rights message in a second received frame.

3. The method of claim 1 wherein the step of sending a link transfer request message further comprises transmitting a first segment of the link transfer request in a first frame and transmitting a second segment in a second frame.

4. The method of claim 2 wherein an encryption variable is positioned in the first segment of the access rights message whereby the subscriber unit may initiate processing of voice information for transmission.

5. The method of claim 4 wherein the encryption variable comprises the frame counter variable which is generated at the radio port controller.

6. A method of performing a link transfer in a wireless personal communications system, wherein a transfer of a radiolink between radio ports is inaudible to a user, the method comprising the steps of:
   suspending voice transmission to a first radio port;
   acquiring signals from a second radio port;
   transmitting a link transfer request in a first message frame from a subscriber unit to a radio port controller via the second radio port; and
   transmitting encrypted voice information from the subscriber unit after transmitting the link transfer request and before receiving a reply from a radio port controller, the encrypted voice information being transmitted in a second message frame directly following the first message frame.

7. The method of claim 6 wherein said first and second message frames are PACS message frames.

8. The method of claim 6 wherein the step of acquiring signals from a second radio port comprises receiving an access rights message containing a voice encryption variable.

9. The method of claim 8 wherein the voice encryption variable is a frame counter generated at the radio port controller.

10. The method of claim 8 wherein the subscriber unit receives the access rights message in a fast channel of two consecutive message frames transmitted from the second radio port.

11. The method of claim 6 wherein the wireless personal communication system is a personal access communication system (PACS).

12. A method for performing a high speed link transfer from a first radio port to a second radio port in a wireless personal communications network, said method comprising the steps of:
   generating an access rights message in a radio port controller, said access rights message comprising an encryption variable;
   transmitting the access rights message over a radio channel from the second radio port;
   receiving a link suspend message from a subscriber unit via the first radio port;
   receiving a link transfer request from the subscriber unit via the second radio port;
   receiving encoded voice and a cipher started message from the subscriber unit via the second radio port;

sending an acknowledgement message and encoded voice to the subscriber unit via the second radio port, wherein the acknowledgement message acknowledges the link transfer request and cipher started messages; and receiving a link transfer completion message from the subscriber unit via the second radio port.

13. The method of claim 12 wherein the wireless personal communications system is a personal access communications system (PACS).

14. The method of claim 13 wherein the encryption variable comprises a frame counter variable.

15. The method of claim 14 wherein the access rights message comprises a first segment and a second segment, said frame counter variable positioned in the first segment, and wherein the step of transmitting the access rights message further comprises transmitting the first segment in a first message frame and transmitting the second segment in a second consecutive message frame.

16. A method of performing a link transfer in a wireless personal communications system, wherein a transfer of a radiolink between radio ports is inaudible to a user, the method comprising the steps of:

suspending voice transmission to a first radio port;

acquiring an access rights message containing a voice encryption variable from a second radio port, the access rights message being received in a fast channel of two consecutive message frames transmitted from the second radio po transmitting a link transfer request from a subscriber unit to a radio port controller via the second radio port; and transmitting encrypted voice information from the subscriber unit after transmitting the link transfer request and before receiving a reply from a radio port controller.

* * * * *